US012604912B2

(12) United States Patent
Miura et al.

(10) Patent No.: US 12,604,912 B2
(45) Date of Patent: Apr. 21, 2026

(54) COOLING DRUM FOR FREEZING GRANULES AND ROTARY FREEZING DEVICE

(71) Applicant: MAYEKAWA MFG. CO., LTD., Tokyo (JP)

(72) Inventors: Jun Miura, Tokyo (JP); Masashi Kato, Tokyo (JP); Masaaki Hanazaki, Tokyo (JP); Hiroki Ito, Tokyo (JP); Toshikazu Sugiyama, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 139 days.

(21) Appl. No.: 18/700,847

(22) PCT Filed: Nov. 10, 2022

(86) PCT No.: PCT/JP2022/041850
§ 371 (c)(1),
(2) Date: Apr. 12, 2024

(87) PCT Pub. No.: WO2023/085345
PCT Pub. Date: May 19, 2023

(65) Prior Publication Data
US 2024/0407404 A1 Dec. 12, 2024

(30) Foreign Application Priority Data
Nov. 15, 2021 (JP) ................................. 2021-185878

(51) Int. Cl.
*A23B 2/80* (2025.01)

(52) U.S. Cl.
CPC .................................... *A23B 2/803* (2025.01)

(58) Field of Classification Search
CPC .. A23B 2/803; A23B 2/94; A23B 9/16; A23B 9/222; A23G 9/16; A23G 9/222
See application file for complete search history.

(56) References Cited

U.S. PATENT DOCUMENTS

2018/0280990 A1 10/2018 Oba et al.

FOREIGN PATENT DOCUMENTS

| CN | 110945975 A | 3/2020 | |
|---|---|---|---|
| EP | 1035387 A1 * | 9/2000 | .............. F25C 1/145 |
| JP | S56114393 U | 9/1981 | |
| JP | H11285352 A | 10/1999 | |

(Continued)

OTHER PUBLICATIONS

Office Action issued in Japanese Appln. No. 2021-185878 mailed on Sep. 2, 2025.

(Continued)

*Primary Examiner* — Cassey D Bauer
(74) *Attorney, Agent, or Firm* — ROSSI, KIMMS & McDOWELL LLP

(57) ABSTRACT
A cooling drum for freezing granules has an inlet for receiving the granules and an outlet located opposite to the inlet for discharging the granules. The cooling drum for freezing granules includes: a first cylinder part having a first inner surface formed of a first material; and a second cylinder part located closer to the outlet than the first cylinder part and having a second inner surface formed of a second material. The first material has a lower thermal conductivity than that of the second material.

10 Claims, 8 Drawing Sheets

(56) References Cited

FOREIGN PATENT DOCUMENTS

| | | | |
|---|---|---|---|
| JP | 4248601 | B1 | 4/2009 |
| JP | 2009296982 | A | 12/2009 |
| JP | 2017074604 | A | 4/2017 |
| WO | 2012001798 | A1 | 1/2012 |
| WO | 2019021086 | A1 | 1/2019 |

OTHER PUBLICATIONS

English translation of Written Opinion issued in Intl. Appln. No. PCT/JP2022/041850 mailed Dec. 13, 2022, previously cited in IDS filed Apr. 12, 2024.
International Preliminary Report on Patentability issued in Intl. Appln. No. PCT/JP2022/041850 mailed May 30, 2024. English translation provided.
International Search Report issued in Intl. Appln. No. PCT/JP2022/041850, mailed Dec. 13, 2022. English translation provided.
Written Opinion issued in Intl. Appln. No. PCT/JP2022/041850, mailed Dec. 13, 2022.

* cited by examiner

35

4

1

40

41

42

9

84

117

100A

84A

110(100)

45

45

85

A–A

TOP

LEFT ← → RIGHT

BOTTOM

REAR

LEFT ← → RIGHT

FRONT

TOP

REAR — FRONT

BOTTOM

FIG. 8

COOLING DRUM FOR FREEZING GRANULES AND ROTARY FREEZING DEVICE

TECHNICAL FIELD

The present disclosure relates to a cooling drum for freezing granules and a rotary freezing device.

BACKGROUND

Conventionally, a rotary freezing device with a cooling drum for freezing granules is known. For example, the rotary freezing device disclosed in Patent Document 1 is equipped with a cooling drum that is arranged in an inclined position so that the outlet is at the bottom. The interior of the cooling drum is divided into multiple chambers along the rotational direction, and granules are fed into one of the chambers through an inlet of the cooling drum. The granules are then frozen by cold air supplied to the interior of the cooling drum in the process of being conveyed to the outlet as the cooling drum rotates.

CITATION LIST

Patent Literature

Patent Document 1: JP2009-296982A

SUMMARY

Problems to be Solved

In the above-described rotary freezing device, the granules fed through the inlet of the cooling drum are rapidly cooled by cold air and may adhere to the inner surface of the cooling drum. In this case, problems may occur; for example, the granules may not be discharged from the cooling drum.

An object of the present disclosure is to provide a cooling drum for freezing granules that prevents frozen granules from remaining inside, and a rotary freezing device.

Solution to the Problems

A cooling drum for freezing granules according to at least one embodiment of the present disclosure is a cooling drum for freezing granules with an inlet for receiving the granules and an outlet located opposite to the inlet for discharging the granules. The cooling drum includes: a first cylinder part having a first inner surface formed of a first material; and a second cylinder part located closer to the outlet than the first cylinder part and having a second inner surface formed of a second material. The first material has a lower thermal conductivity than that of the second material.

A rotary freezing device for freezing granules according to at least one embodiment of the present disclosure is provided with: the above-described cooling drum for freezing granules arranged horizontally; and a pair of support rollers disposed rotatably on opposite sides of the axis of the cooling drum for freezing granules and each supporting the cooling drum for freezing granules from below.

Advantageous Effects

The present disclosure provides a cooling drum for freezing granules that prevents frozen granules from remaining inside, and a rotary freezing device.

BRIEF DESCRIPTION OF DRAWINGS

FIG. 8 is a schematic diagram of a cooling drum according to another embodiment as viewed from the axial direction.

DETAILED DESCRIPTION

A rotary freezing device for freezing granules (hereinafter, also simply referred to as "freezing device") according to some embodiments of the present disclosure will be described.

It is intended, however, that unless particularly identified, dimensions, materials, shapes, relative positions and the like of components described in the embodiments shall be interpreted as illustrative only and not intended to limit the scope of the present invention.

The following description uses left/right, front/rear, and top/bottom, indicated by arrows in the figures. The left-right direction and the front-rear direction are both parallel to the horizontal direction. The top-bottom direction is parallel to the vertical direction.

1. Overview of Freezing Device 1

Figure 1:
FIG. 1 is a schematic perspective view of a freezing device according to an embodiment of the present disclosure.

FIG. 1 is a schematic perspective view of a freezing device 1 according to an embodiment of the present disclosure. In FIG. 1, a casing 4 (described later) of the freezing device 1 is shown by the double-dotted dashed line, and the interior of the casing 4 is shown by the solid or dashed line.

The freezing device 1 is configured to individually freeze granules 5 fed into a cooling drum 100 for freezing granules (hereinafter, also simply referred to as "cooling drum 100"), using cold air circulating inside the casing 4. Individually freezing refers to dispersing granules 5 and freezing them separately. It is preferable that the granules 5 to be individually frozen not adhere to each other.

The granules 5 in this example are edible granules or particles. The edible granules include grains and beans. The grains include rice, which can be cooked white rice or cooked fried rice. The beans include green peas, peas, and soybeans.

The edible granules may be granular vegetables, fruits, or seafood. Examples of the granular vegetables include chopped onion and carrot. Examples of the granular fruits include blueberry, grape, strawberry, and cherry. Examples of the granular seafood include small shrimp and baby sardine. The edible granules may be meat or other products that have been cut or otherwise processed into particles.

The freezing device 1 has a casing 4 and a cooling drum 100 disposed inside the casing 4. In this embodiment, as an example, the cooling drum 100 is installed horizontally inside the casing 4. The horizontal orientation means that the axial direction of the cooling drum 100 is parallel to the horizontal direction, or that the acute angle between the axis of the cooling drum 100 and the horizontal line is not more than 60 degrees. The acute angle between the axial direction of the cooling drum 100 and the horizontal line is preferably not more than 45 degrees, more preferably not more than 30 degrees. The cooling drum 100 shown in the figure is a horizontally extending cylinder, with the front-rear direction as the axial direction, for example. Hereinafter, the axial direction of the cooling drum 100 may simply be referred to as the "axial direction".

An inlet 111 is formed at the front end of the cooling drum 100 to receive the granules 5, and an outlet 122 is formed at the rear end to discharge the granules 5. As illustrated, the outlet 122 is located opposite to the inlet 111.

The cooling drum 100 according to this embodiment includes a first cylinder part 110 with the inlet 111 and a second cylinder part 120 with the outlet 122. At least one communication opening 125 is formed in a cylinder wall 126 of the second cylinder part 120, which is located closer to the outlet 122 than the first cylinder part 110, and a configuration is adopted that allows cold air to flow into the cooling drum 100 not only through the inlet 111 but also through the communication opening 125.

The cooling drum 100 according to another embodiment may be installed vertically inside the casing 4. The vertical orientation means that the axial direction of the cooling drum 100 is parallel to the vertical direction, or that the acute angle between the axis of the cooling drum 100 and the vertical line is less than 30 degrees.

The casing 4 illustrated in FIG. 1 extends along the axial direction (front-rear direction) of the cooling drum 100, and the interior of the casing 4 is divided into four main sections when viewed from the front side. Of these sections, the lower left section forms a drum accommodation chamber 15 for accommodating the cooling drum 100, and the upper left section forms a drive part accommodation chamber 35, which will be described below. In each of the upper right and lower right sections, a return passage 88 is formed for cold air discharged from the cooling drum 100 to return to the cooling drum 100. As described in detail below, the return passage 88 includes a pair of parallel passages 881 parallel to each other and a pair of dehumidifiers 882 (see FIG. 4) disposed in the pair of parallel passages 881, respectively.

FIG. 1 only schematically shows an example of the casing 4, and the interior of the casing 4 may be divided into five or more sections when viewed from the front side (see FIGS. 3 and 4), or it may not be divided at all.

These sections need not necessarily be separated over the entire length of the casing 4 in the longitudinal direction. In this embodiment, a passage partition wall 85, which separates the interior of the casing 4 into left and right sides, is not provided at the rear of the casing 4, and the outlet 122 of the cooling drum 100 communicates with each of the pair of parallel passages 881. Further, a right partition wall 83R, which separates the upper right section from the lower right section, is provided in a central portion of the casing 4 in the front-rear direction, and a cooling passage 89 in front of the pair of parallel passages 881 is not separated into upper and lower sections.

The lower left, upper right, and lower right sections of the interior of the casing 4 form a circulation passage 6 for cold air to circulate inside the casing 4. In other words, the drum accommodation chamber 15, in which the cooling drum 100 is installed, and the return passage 88 and the cooling passage 89, which are located to the right of the drum accommodation chamber 15, constitute the circulation passage 6.

The freezing device 1 according to this embodiment is further equipped with a cooler 9 disposed in the cooling passage 89 of the circulation passage 6. The cooler 9 is configured to cool the cold air below a specified temperature. The cooler 9 in this example is a heat transfer tube that penetrates the cooling passage 89. This heat transfer tube is part of a refrigeration cycle (not shown), and refrigerant flows inside the heat transfer tube. The refrigerant is previously cooled by heat exchange with another heating medium and then flows into the heat transfer tube to cool the cold air below the specified temperature.

The freezing device 1 according to this embodiment is further equipped with a blowing means 7 for circulating the cold air through the circulation passage 6. The blowing means 7 in this example includes two fans 7A disposed on a passage partition wall 85 and a fan drive part (not shown) for rotating and driving the two fans 7A. The two fans 7A are configured to send the cold air to a front space 15F and a rear space 15R of the drum accommodation chamber 15, respectively. Both spaces may be separated by a partition plate 84 (see FIG. 2), which is not illustrated in FIG. 1.

An overview of the operation of the freezing device 1 shown in FIG. 1 is as follows.

Cold air circulates through the circulation passage 6 as the cooler 9 and the blowing means 7 operate. Part of the cold air sent by the blowing means 7 flows through the front space 15F and enters the cooling drum 100 from the inlet 111, while the remaining cold air flows through the rear space 15R and enters the cooling drum 100 from the communication opening 125. The cooling drum 100 rotates around the axis 100A (arrow R) as a drive part 40, which will be described below, accommodated in the drive part accommodation chamber 35 is driven.

A feeding device 18 (see FIG. 2), not illustrated in FIG. 1, then feeds granules 5 into the inlet 111 of the cooling drum 100. The cooling drum 100 freezes the granules 5 while conveying them from the inlet 111 to the outlet 122 by the cold air flowing into the interior (i.e., the cold air flowing into the cooling drum 100 serves both functions of conveying and freezing the granules 5). The velocity of the cold air flowing through the cooling drum 100 from the inlet 111 to the outlet 122 is, for example, 3 m/s or higher.

The granules 5 are conveyed while being agitated inside the rotating first cylinder part 110. Accordingly, the granules 5 disperse and float, and each granule 5 is evenly cooled by the cold air. When the granules 5 reach the downstream end of the first cylinder part 110, the precooling of the granules 5 is approximately complete and the periphery of each granule 5 begins to freeze. The temperature of the granules 5 at this time is 0 to 5° C., for example.

The granules 5 passing through the interior of the second cylinder part 120 are cooled by the cold air flowing in from the first cylinder part 110 and the cold air flowing in from the communication opening 125. The cold air flowing in from the communication opening 125 has relatively low temperature because it has not exchanged heat with the granules 5.

The cold air flowing in from the two supply passages merges inside the second cylinder part 120 and cools the granules 5, which accelerates the freezing of the granules 5, so that each granule 5 is frozen to the inside. The granules 5 are then discharged from the outlet 122 of the cooling drum 100 in an individually frozen state. The cold air discharged from the outlet 122 flows through the pair of parallel passages 881 of the return passage 88 to the cooling passage 89 (arrows A and B), where it is cooled by the cooler 9 and then returned to the blowing means 7.

Various methods may be employed to remove the individually frozen granules 5 from the casing 4. For example, the individually frozen granules 5 may be stored in a tray (not shown) disposed adjacent to the outlet 122 and removed by an operator or robot arm at any timing, or they may be discharged outside the casing 4 by a discharge device such as a conveyor belt.

The freezing device 1 has been schematically described, but the above-described embodiments are only illustrative. For example, the return passage 88 does not have to be separated between the upper right and lower right sections of the casing 4. In this case, the right partition wall 83R is not provided. Further, the fan 7A may be disposed in the cooling passage 89 or the return passage 88. Further, the number of fans 7A may be one. In this case, the cold air sent by the fan 7A may flow into the cooling drum 100 only through the inlet 111. Thus, the partition plate 84 (see FIG. 2) may not be provided in the drum accommodation chamber 15, and the communication opening 125 may not be provided in the cooling drum 100.

With the above configuration, the cold air sent by the blowing means 7 has both functions of freezing the granules 5 and conveying the granules 5 to the outlet 122 of the cooling drum 100. This eliminates the need for a component such as a belt to convey the granules 5 from the inlet 111 to the outlet 122 of the cooling drum 100, downsizing the freezing device 1.

2. Detailed Configuration of Drum Accommodation Chamber 15

Figure 2:
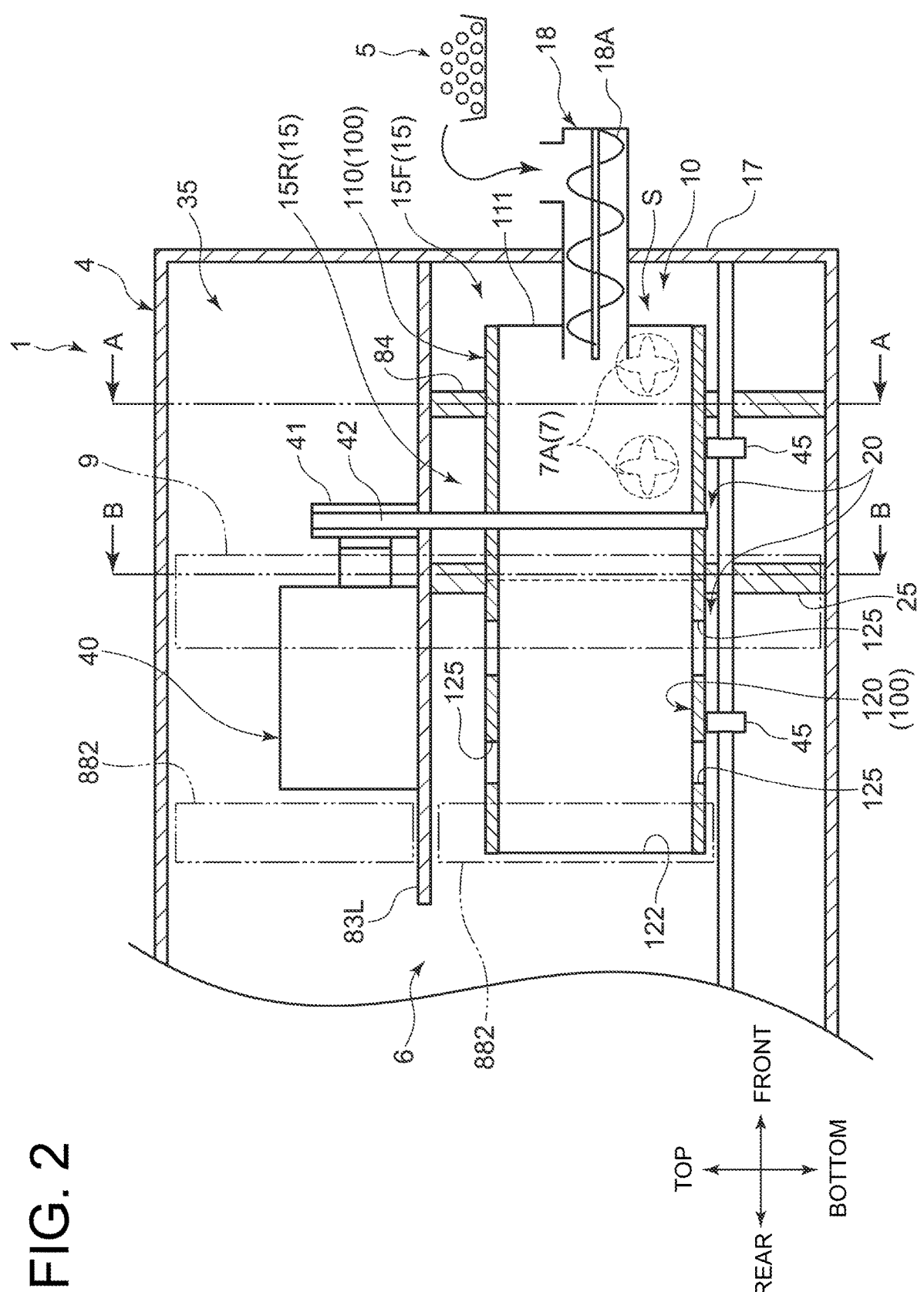
FIG. 2 is a schematic cross-sectional view of the left side of the freezing device according to an embodiment of the present disclosure.
Figure 3:
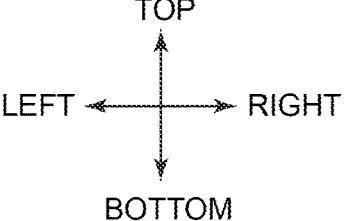
FIG. 3 is a schematic cross-sectional view as viewed from the direction of arrows A-A in FIG. 2.
Figure 4:
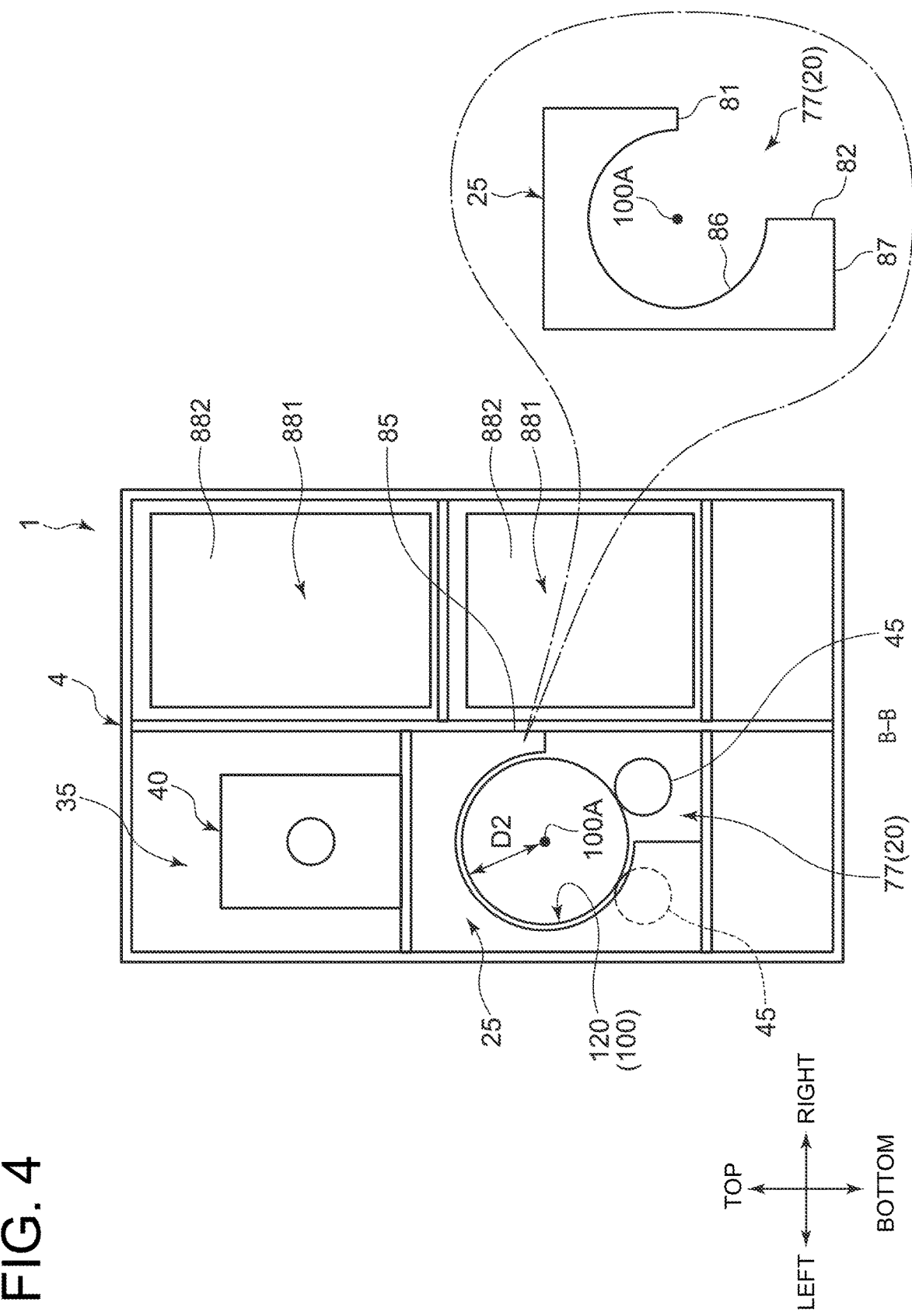
FIG. 4 is a schematic cross-sectional view as viewed from the direction of arrows B-B in FIG. 2.

The detailed configuration of the drum accommodation chamber 15 will be described with reference to FIGS. 2 to 4. FIG. 2 is a schematic cross-sectional view of the left side of the freezing device 1 according to an embodiment of the present disclosure. FIG. 3 is a schematic cross-sectional view as viewed from the direction of arrows A-A in FIG. 2. FIG. 4 is a schematic cross-sectional view as viewed from the direction of arrows B-B in FIG. 2.

As illustrated in FIG. 2, the drum accommodation chamber 15, which is a component of the circulation passage 6, is divided into the front space 15F and the rear space 15R by the partition plate 84. In the example of this figure, the partition plate 84 is disposed on the inlet 111 side rather than the center of the cooling drum 100 in the axial direction. As a more specific example, the partition plate 84 may be disposed between the front end and the rear end of the first cylinder part 110. The axial distance from the inlet 111, the front end of the first cylinder part 110, to the partition plate 84 is not more than one-half the axial length of the first cylinder part 110, or not more than one-third in the example of FIG. 2.

As illustrated in FIG. 3, the partition plate 84, which extends perpendicular to the axial direction, has a circular inner edge 84A that circumferentially surrounds the outer peripheral surface of the first cylinder part 110. The inner edge 84A and the outer peripheral surface of the first cylinder part 110 are close enough to each other to make it difficult for the cold air to pass through. Thus, the partition plate 84 fluidly separates the rear space 15R and the front space 15F of the drum accommodation chamber 15. In other words, the partition plate 84 fluidly separates the rear space 15R, the space at a side of the outlet 122 in the outer space of the cooling drum 100, from the inlet 111.

The inner edge 84A and the first cylinder part 110 may be in contact with each other, but it is preferable that they face each other with a slight gap so that the rotating first cylinder part 110 does not rub against the inner edge 84A.

Returning to FIG. 2, a first supply passage 10 is formed in the front space 15F of the drum accommodation chamber 15 to guide the cold air cooled by the cooler 9 to the inlet 111 of the cooling drum 100. Further, a second supply passage 20 is formed in the rear space 15R to guide the cooled cold air to the interior of the cooling drum 100 (second cylinder part 120) through the communication opening 125.

In this example, the two fans 7A are provided for the first supply passage 10 and the second supply passage 20, one for each, and the first supply passage 10 and the second supply passage 20 are separated by the partition plate 84. Accordingly, the first supply passage 10 and the second supply passage 20 are disposed parallel to each other, and part of the cold air sent by the blowing means 7 flows through the first supply passage 10, while the remaining cold air flows through the second supply passage 20.

With the above configuration, since only part of the cold air cooled by the cooler 9 flows through the first supply passage 10 and enters the inlet 111 of the cooling drum 100, it is possible to suppress rapid cooling of the granules 5 in the first cylinder part 110. This prevents adhesion of the granules 5 to the cooling drum 100, which can be caused when the granules 5 with moisture on the periphery are frozen. Additionally, the reduction of the cold air flowing into the inlet 111 controls the conveyance speed of the granules 5 at the inlet 111 of the cooling drum 100 and ensures the retention time of the granules 5 in the cooling drum 100, so that the granules 5 can be sufficiently frozen. Furthermore, the cold air of relatively low temperature that has not exchanged heat with the granules 5 flows into the second cylinder part 120, close to the outlet 122 of the cooling drum 100, through the communication opening 125 and merges with the cold air flowing in through the inlet 111. Therefore, the granules 5 can be sufficiently frozen inside the second cylinder part 120 as well.

The configuration of the first supply passage 10 will be described with reference to FIG. 2.

The drum accommodation chamber 15 has a facing wall 17 that faces the inlet 111 of the cooling drum 100 with a gap S in the axial direction. As an example, the facing wall 17 constitutes part of the front wall of the casing 4 and is provided with a feeding device 18 for feeding the granules 5 into the cooling drum 100. In this embodiment, since the cooling drum 100 rotates inside the casing 4, the gap S is unavoidably formed at the axial position between the cooling drum 100 and the facing wall 17. In FIG. 2, which is a schematic diagram, the gap S is shown larger than it actually is for the sake of clarity of the drawing.

In this configuration, the first supply passage 10 is the space in the front space 15F of the drum accommodation chamber 15 from the fan 7A through the gap S to the inlet 111. However, the cold air sent from the fan 7A to the front space 15F does not have to follow the first supply passage 10 exactly from the upstream end to the downstream end. For example, the cold air may temporarily stay in a position off the first supply passage 10 in the front space 15F and then flow from a point halfway up the first supply passage 10 to the inlet 111. In this case, the stagnant cold air can cool the first cylinder part 110 and keep the temperature of the first cylinder part 110 below a specified temperature.

The feeding device 18 is provided with a screw blade 18A that rotates with the front-rear direction as the axial direction. The rotating screw blade 18A conveys the granules 5 fed into the feeding device 18 toward the inlet 111.

With the above configuration, the freezing device 1 can be further downsized because the gap S formed unavoidably between the facing wall 17 with the feeding device 18 and the rotating cooling drum 100 is used as the first supply passage 10 for the cold air.

The configuration of the second supply passage 20 will be described with reference to FIGS. 2 and 4.

As illustrated in FIG. 2, the second supply passage 20 is formed in at least part of the rear space 15R that extends in the axial direction. Specifically, the space in the rear space 15R from the rear fan 7A to the communication opening 125 of the second cylinder part 120 corresponds to the second supply passage 20, and the above-described partition plate 84 defines the front end of the second supply passage 20.

Further, an adjustment plate 25 is provided in the second supply passage 20 between the communication opening 125 and the inlet 111 as a component of the circulation passage 6. The adjustment plate 25 in this example is provided at the same axial position as the border between the first cylinder part 110 and the second cylinder part 120. The adjustment plate 25 is configured to collect the flow of cold air in the second supply passage 20 toward the communication opening 125 in the circumferential direction of the cooling drum 100. This allows the cold air to concentrate in a partial range in the circumferential direction of the cooling drum 100 and flow vigorously downstream of the adjustment plate 25. For example, if the cold air is concentrated below the cooling drum 100, the cold air can flow into the second cylinder part 120 of the cooling drum 100 through the communication opening 125 at the bottom to lift the granules 5. Thus, the granules 5 can be frozen in a more dispersed state.

As illustrated in FIG. 4, the adjustment plate 25 is configured to concentrate the flow of cold air below the axis 100A of the cooling drum 100 in a flow path cross-section of the second supply passage 20. More specifically, the adjustment plate 25 forms an adjustment passage 77, through which the cold air passes, only in a partial range in the circumferential direction of the cooling drum 100.

An example of the structure of the adjustment plate 25 will be described. The adjustment plate 25 has a semicircular inner edge 86 surrounding the cooling drum 100, an outer edge 87, and a first connection portion 81 and a second connection portion 82 connected to the inner edge 86 and the outer edge 87. In the circumferential direction, the first connection portion 81 and the second connection portion 82 face each other with a space between them, and this space corresponds to the adjustment passage 77, which constitutes the second supply passage 20. In the example of FIG. 4, the adjustment passage 77 is formed at the lower right side with respect to the axis 100A of the cooling drum 100, and the angle from the first connection portion 81 through the adjustment passage 77 to the second connection portion 82 with respect to the axis 100A (hereinafter, referred to as the formation angle of the adjustment passage 77) is 90 degrees.

The cold air sent to the rear space 15R by the fan 7A concentrates in the adjustment passage 77 as it passes through the adjustment plate 25. This allows the cold air to concentrate in a partial range in the circumferential direction of the cooling drum 100 and flow vigorously downstream of the adjustment plate 25.

The formation angle of the adjustment passage 77 is not limited to 90 degrees. For example, when the second connection portion 82 connects the left ends of the inner edge 86 and the outer edge 87, the formation angle of the adjustment passage 77 is 180 degrees, and the adjustment passage 77 is formed on the substantially lower half of the adjustment plate 25. Alternatively, the adjustment passage 77 may be formed on the substantially left half or lower left of the adjustment plate 25.

With the above configuration, since at least part of the second supply passage 20 is defined by the partition plate 84, the configuration of the circulation passage 6 can be simplified.

Further, since the flow of cold air through the second supply passage 20 is concentrated in a partial range in the circumferential direction by the adjustment plate 25, the circumferential range of the cooling drum 100 (second cylinder part 120) where the cold air flows in can be biased. Since the circumferential range where the cold air flows into the second cylinder part 120 can be contained within a specified partial range, the cooling performance of the cooling drum 100 and the conveying performance for the granules 5 can be achieved as intended.

As a specific example, when the adjustment passage 77 is formed below the axis 100A, the circumferential range where the cold air flows into the second cylinder part 120 is below the axis 100A. As a result, the cold air flowing in from the communication opening 125 easily hits the granules 5, and with this upward cold air, the granules 5 can be lifted and conveyed appropriately. Thus, the speed at which the granules 5 travel to the outlet 122 can be adjusted, and the retention time of the granules 5 in the second cylinder part 120 can be optimized, so that the second cylinder part 120 can exert sufficient cooling performance for the granules 5.

The granules 5 have been pre-cooled when they reach the upstream end of the second cylinder part 120, and some moisture contained in the granules 5 has been absorbed by the cold air. Therefore, the granules 5 are lighter than when they were fed into the drum, so the granules are easily lifted by the cold air flowing in from the communication opening 125 and thus frozen by the cold air in a dispersed state. This helps to control uneven cooling of the granules 5. If the method of freezing granules 5 conveyed by a belt with cold air is adopted, a vibration-applying member is needed to apply vibration to the belt in order to lift the granules 5. Such a method, however, requires the vibration-applying member to repeatedly hit the belt (or the connecting member connected to the belt), which may not provide high durability. In this regard, with the above configuration, since the cold air lifts the granules 5, the vibration-applying member is not necessary, and the freezing device 1 with high durability can be achieved.

3. Details of Driving Mechanism of Cooling Drum 100

The details of the driving mechanism of the cooling drum 100 will be described with reference to FIGS. 2 to 4.

As illustrated in FIG. 2, a drive part accommodation chamber 35 for accommodating a drive part 40 is disposed above the drum accommodation chamber 15. The drive part 40 is configured to provide a torque to the cooling drum 100 and is, for example, a motor (hereinafter, drive part 40 may be referred to as motor 40).

The freezing device 1 is equipped with a sprocket 41 connected to the motor 40 and a chain belt 42 engaging the sprocket 41 and outer teeth (not shown) formed on the cooling drum 100. The chain belt 42 is in both the drive part accommodation chamber 35 and the drum accommodation chamber 15. Accordingly, a left partition wall 83L, which separates the drum accommodation chamber 15 from the drive part accommodation chamber 35, has a hole (not shown) open at the top and bottom in which the chain belt 42 is placed.

This structure allows the drive power of the motor 40 to be transmitted to the cooling drum 100 via the chain belt 42 to rotate the cooling drum 100.

The freezing device 1 is equipped with a pair of support rollers 45 rotatably disposed on opposite sides of the axis 100A of the cooling drum 100 in the drum accommodation chamber 15. In the illustrated embodiment, the pair of support rollers 45 is provided below the first cylinder part 110 and below the second cylinder part 120. In other words, four support rollers 45 in total are provided in this example (see FIGS. 3 and 4). Each of the pair of support rollers 45 supports the cooling drum 100 from below. Thus, the pair of support rollers 45 can rotate with the rotation of the cooling drum 100 driven by the motor 40.

With the above configuration, since the pair of support rollers 45 supports the cooling drum 100 from below, the cooling drum 100 can be rotated in a more stable manner.

Additionally, since the mechanism for rotating the cooling drum 100 is realized by the motor 40, the sprocket 41, and the chain belt 42, the cooling drum 100 can be rotated with a simple configuration.

4. Detailed Configuration of Return Passage 88

Figure 5:
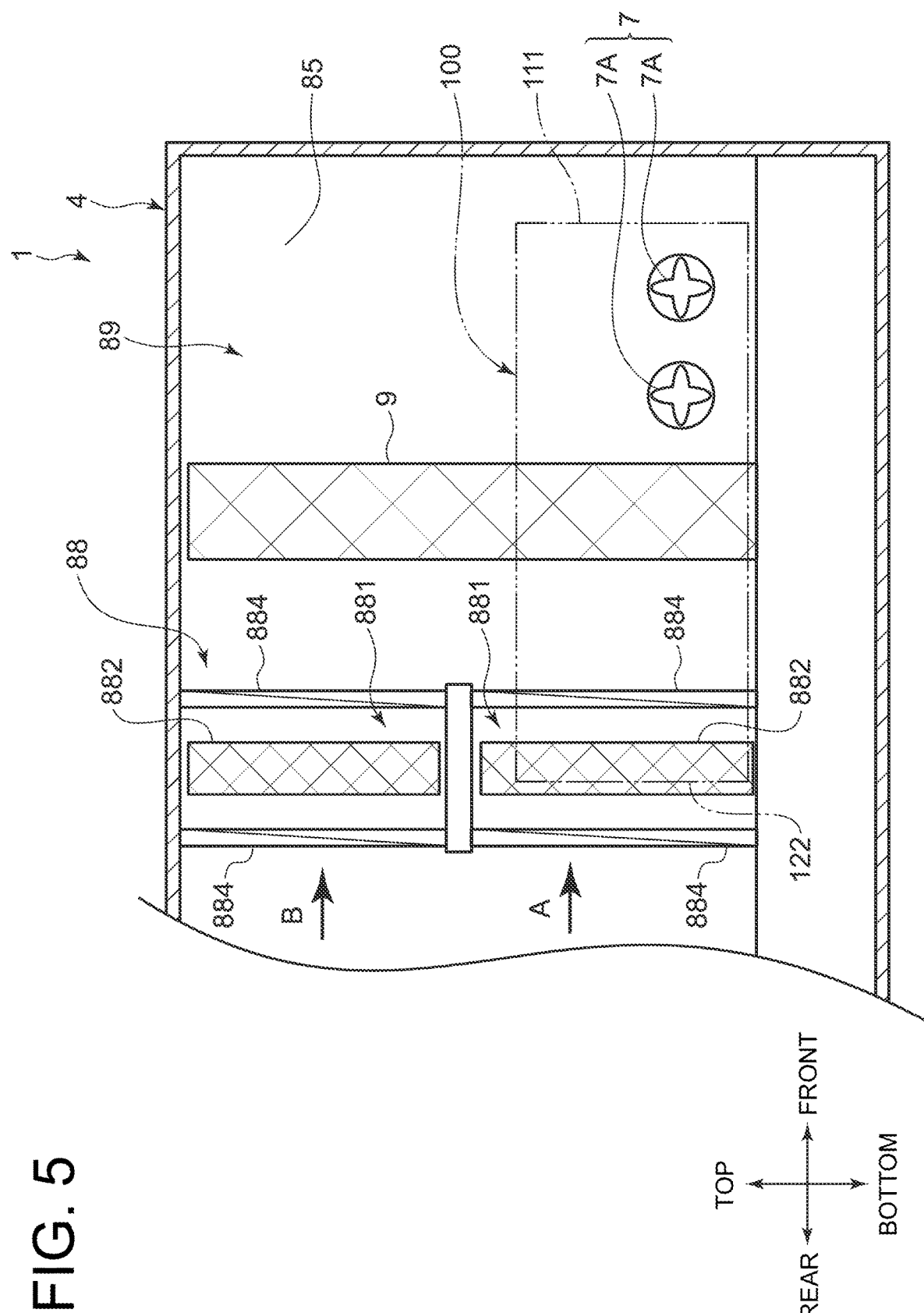
FIG. 5 is a schematic cross-sectional view of the right side of the freezing device according to an embodiment of the present disclosure.

The detailed configuration of the return passage 88 will be illustrated with reference to FIG. 5. FIG. 5 is a schematic cross-sectional view of the right side of the freezing device 1 according to an embodiment of the present disclosure.

As described above, the return passage 88, which is a component of the circulation passage 6, is configured to return the cold air discharged from the outlet 122 of the cooling drum 100 to the inlet 111 or the communication opening 125 of the cooling drum 100. In the illustrated embodiment, the return passage 88 extends in the axial direction. At least part of the return passage 88 is provided at a position overlapping the cooling drum 100 in the axial direction.

The cooling drum 100, an essential component of the freezing device 1, has the function of freezing the granules 5 while conveying them, and requires a certain amount of axial length. With the above configuration, since the return passage 88 overlaps the cooling drum 100 in the axial direction, the entire axial length of the freezing device 1 can be made closer to the axial length of the cooling drum 100. Thus, the freezing device 1 can be further downsized.

The return passage 88 in this embodiment is separated from the drum accommodation chamber 15 and the drive part accommodation chamber 35 by the above-described passage partition wall 85 extending in the axial direction (see FIG. 1). With the above configuration, since the passage partition wall 85 has the function of defining both the drum accommodation chamber 15 and the drive part accommodation chamber 35 and the return passage 88, the drum accommodation chamber 15 and the drive part accommodation chamber 35 can be closer to the passage partition wall 85 in the left-right direction. Thus, the freezing device 1 can be further downsized.

In the embodiment illustrated in FIG. 5, the return passage 88 has a pair of parallel passages 881, a pair of dehumidifiers 882 disposed in the pair of parallel passages 881, respectively, and a switching valve 884 configured to alternately connect the pair of parallel passages 881 to the outlet 122 of the cooling drum 100. If the granules 5 fed into the cooling drum 100 contain a relatively large amount of moisture, the cold air that has frozen the granules 5 is discharged from the cooling drum 100 with a relatively high humidity. For example, if the granules 5 fed into the inlet 111 are white rice that has just cooked or fried rice that has just cooked, the granules 5 fed into the cooling drum 100 emit a relatively large amount of steam before they are frozen, resulting in humid cold air is discharged from the outlet 122. This cold air is dehumidified by the dehumidifiers 882 as it passes through the return passage 88. This suppresses the formation of frost in the cooler 9 downstream of the return passage 88 and suppresses a reduction in cooling performance of the cooler 9.

The pair of return passages 88 are disposed side-by-side at the top and bottom and parallel to each other. Each dehumidifier 882 includes a heat transfer tube with refrigerant flowing inside, a heater disposed in the heat transfer tube, and a drain pan. The heat transfer tube of the dehumidifier 882 has the same configuration as that of the cooler 9. As the cold air passing through the dehumidifier 882 is cooled, frost adheres to the heat transfer tube. The frost is liquefied by heat of the heater and is discharged outside the freezing device 1 via the drain pan.

The switching valve 884 in this example is an open/close valve installed downstream and upstream of each dehumidifier 882. For convenience of explanation, the two switching valves 884 corresponding to the top dehumidifier 882 will be referred to as the top switching valves 884 and the two switching valves 884 corresponding to the bottom dehumidifier 882 will be referred to as the bottom switching valves 884.

For example, when the top dehumidifier 882 is in operation, the two top switching valves 884 open and the top return passage 88 is in communication with the outlet 122 of the cooling drum 100. At this time, the two bottom switching valves 884 are closed and the bottom parallel passage 881 is in non-communication with the outlet 122. Thus, the cold air discharged from the cooling drum 100 flows into the top parallel passage 881 and is dehumidified by the top dehumidifier 882. Eventually, as the frost accumulates on the top dehumidifier 882, the two top switching valves 884 close and the two bottom switching valves 884 open. The cold air from the cooling drum 100 flows into the bottom parallel passage 881 and is dehumidified by the operating bottom dehumidifier 882. At this time, the top dehumidifier 882 is not in operation, and the frost is liquefied and discharged by the heater and the drain pan.

Thus, the top dehumidifier 882 and the bottom dehumidifier 882 operate alternately, and defrost is performed on the dehumidifier 882 that is not in operation. This enables continuous and stable dehumidification of the cold air.

In other embodiments, the switching valve 884 is not limited to an open/close valve as described above, but may be embodied by a single three-way valve, for example. Even with a three-way valve, it is possible to realize a structure that alternately connects the pair of parallel passages 881 to the outlet 122 of the cooling drum 100.

With the above configuration, of the pair of dehumidifiers 882, the dehumidifier 882 that is in communication with the outlet 122 of the cooling drum 100 can be operated, while the dehumidifier 882 that is not in communication with the outlet 122 can be deactivated to defrost. This allows the pair of dehumidifiers 882 to alternately dehumidify the cold air, enabling continuous and stable dehumidification of the cold air discharged from the outlet 122 of the cooling drum 100. Further, in this embodiment, the bottom parallel passage 881 overlaps the drum accommodation chamber 15 in lateral view, and the top parallel passage 881 overlaps the drive part accommodation chamber 35 in lateral view (see FIG. 1). In other words, the drum accommodation chamber 15 overlaps the bottom parallel passage 881 in the vertical direction, and the drive part accommodation chamber 35 overlaps the top parallel passage 881 in the vertical direction.

With the above configuration, since the drive part accommodation chamber 35 and the from accommodation chamber 15, the installation spaces for the drive part 40 and the cooling drum 100, overlap the installation space for the pair of parallel passages 881 in the vertical direction, the freezing device 1 can be shortened in the vertical direction. Thus, the freezing device 1 can be further downsized.

5. Detailed Configuration of Cooling Drum 100

Figure 6:
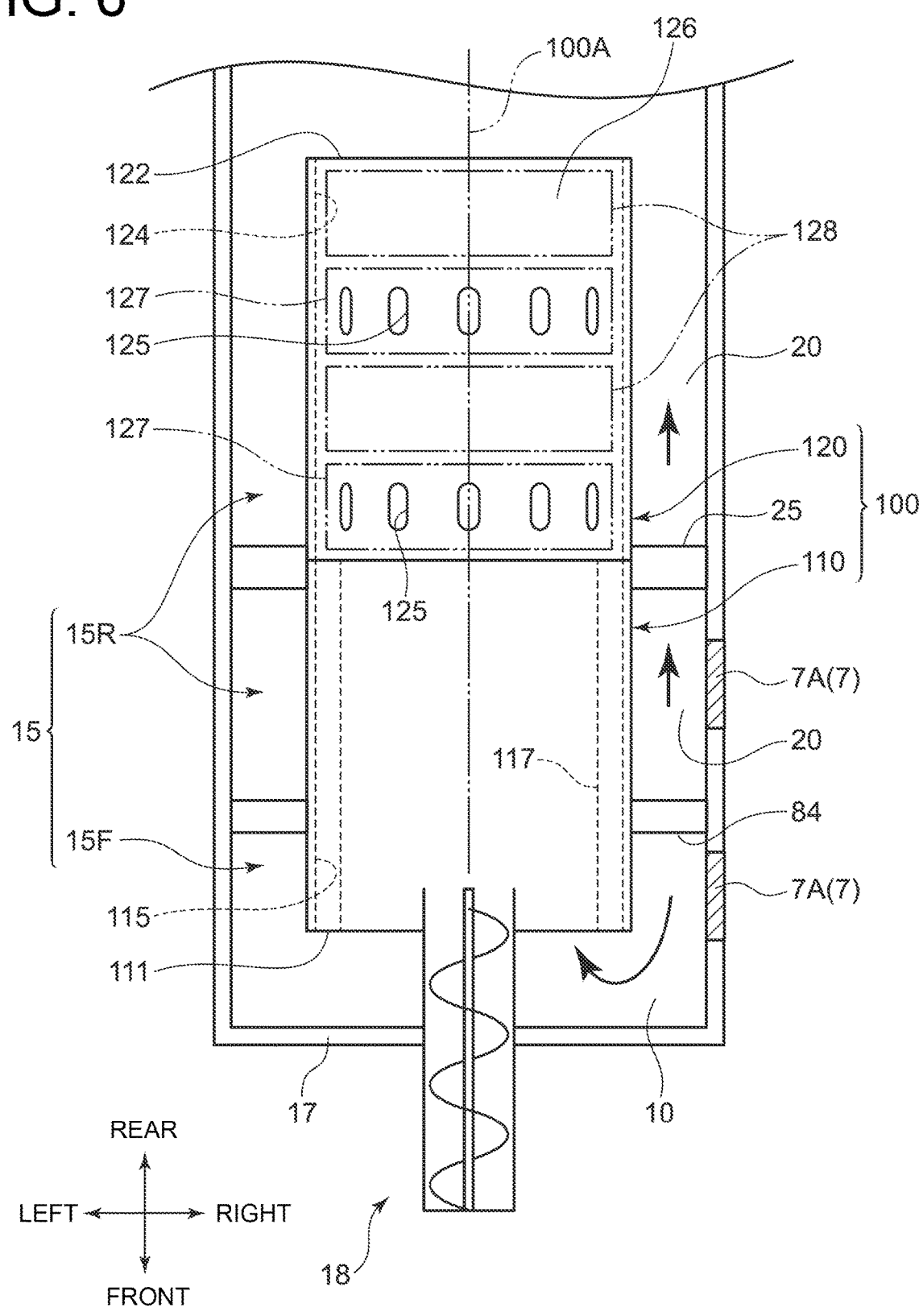
FIG. 6 is a schematic plan view of a cooling drum according to an embodiment of the present disclosure.

The detailed configuration of the cooling drum 100 will be described with reference to FIG. 6. FIG. 6 is a schematic plan view of the cooling drum 100 according to an embodiment of the present disclosure.

The cooling drum 100 according to this embodiment includes a first cylinder part 110, and a second cylinder part 120 located closer to the outlet 122 than the first cylinder part 110, as described above. The first cylinder part 110 and the second cylinder part 120 are arranged coaxially and have the same inner diameter. In this embodiment, the first cylinder part 110 and the second cylinder part 120 have the same axial length.

The first cylinder part 110 has a first inner surface 115 formed of a first material, and the second cylinder part 120 has a second inner surface 124 formed of a second material. The thermal conductivity of the first material is lower than that of the second material.

For example, the first material is a resin material. The resin material is preferably ultra-high molecular weight polyethylene (UHMW) or polyacetal (POM). On the other hand, the second material is a metal material. The metal material is preferably stainless steel (SUS). This limits the heat exchange between the first inner surface 115 and the granules 5 compared to the heat exchange between the second inner surface 124 and the granules 5.

In another embodiment, the second cylinder part 120 may be shorter than the first cylinder part 110. For example, the axial length of the second cylinder part 120 may be not more than half, ⅓, or ¼ the axial length of the first cylinder part 110. Additionally, the inner diameter of the second cylinder part 120 may be larger than that of the first cylinder part 110.

The granules 5 immediately after being fed into the cooling drum 100 have not yet reached the freezing temperature and therefore contain a relatively large amount of water in the liquid phase. Therefore, if the granules 5 are cooled rapidly, there is a risk that the granules 5 will adhere to the inner surface of the cooling drum 100. In this regard, with the above configuration, the low thermal conductivity of the first material constituting the first inner surface 115 limits the heat exchange between the granules 5 and the first inner surface 115, which prevents the granules 5 from adhering to the first inner surface 115. Thus, it is possible to achieve the cooling drum 100 that prevents the frozen granules 5 from remaining inside.

Additionally, if the first material is a resin material, the heat exchange between the granules 5 and the first inner surface 115 can be limited appropriately, and if the second material is a metal material, the heat exchange between the granules 5 and the second inner surface 124 can be promoted well.

The first cylinder part 110 in this embodiment further includes a protrusion 117 disposed on the first inner surface 115 and extending in the front-rear direction, i.e., the axial direction. When the cooling drum 100 rotates, the protrusion 117 scrapes up the granules 5 fed through the inlet 111.

For example, the protrusion 117 may extend over the entire length of the first cylinder part 110 in the axial direction of the cooling drum 100. The protrusion 117 in this example is plate-shaped with a thickness direction parallel to the circumferential direction of the cooling drum 100. The material of the protrusion 117 is the same as that of the first inner surface 115. In this example, a plurality of protrusions 117 are arranged at equal intervals along the circumferential direction. The number of protrusions 117 is four as an example (see FIG. 3). The protrusion 117 may be formed separately from the first inner surface 115. Therefore, the material of the protrusion 117 may be different from that of the first inner surface 115.

With the above configuration, the rotating protrusion 117 scrapes up the granules 5 inside the first cylinder part 110 and causes the granules 5 to float in a dispersed state inside the cooling drum 100. Thus, the granules 5 can be exposed to the cold air and begin to freeze in a dispersed state, which prevents the granules 5 from freezing in an aggregated state. The granules 5 scraped up by the protrusion 117 is prevented from contacting the first inner surface 115, which further prevents the granules 5 from adhering to the first inner surface 115. Further, since the granules 5 floated in a dispersed state by scraping are separately exposed to cold air flowing in from the inlet 111, the granules 5 are cooled evenly. Therefore, the granules 5 can be individually frozen well.

Additionally, since the protrusion 117 extends over the entire length of the first cylinder part 110 in the axial direction, the granules 5 are continuously scraped up by the protrusion 117 while they pass inside the first cylinder part 110. Therefore, the granules 5 can be individually frozen better.

In a radial cross-section of the second cylinder part 120 in this embodiment, the distance (dimension D2 in FIG. 4) from the center of the second cylinder part 120 to the second inner surface 124 is constant in the circumferential direction. In other words, the second inner surface 124 is not provided with a component such as the protrusion 117.

With the above configuration, inside the second cylinder part 120, excessive scraping of the granules 5 is suppressed, so the granules 5 move toward the outlet 122 while contacting the second inner surface 124. This allows the granules 5 to pass through the second cylinder part 120 for a longer time, promoting the heat exchange between the second inner surface 124 and the granules 5. Therefore, the granules 5 can be frozen sufficiently to the inside, and the granules 5 can be individually frozen better.

In the embodiment where the adjustment passage 77 is provided at least below the adjustment plate 25, the cold air passes through the communication opening 125 from bottom to top and hits the granules 5. As described above, since the granules 5 in the second cylinder part 120 are lighter than when there were fed in, the upward cold air passing through the communication opening 125 causes the granules 5 to float appropriately even without the protrusion 117.

The communication opening 125 in this embodiment connects the second supply passage 20, which is a cold air path formed on the outer side, to the inner side of the second cylinder part 120. The communication opening 125 is, for example, an elongated hole extending in the axial direction. The communication opening 125 may be a circular or rectangular hole.

The formation range of the communication opening 125 will be described. On the cylinder wall 126 of the second cylinder part 120 in this embodiment, a formed region 127 where the communication opening 125 is formed and a non-formed region 128 where the communication opening 125 is not formed are arranged along the axial direction. In the example of FIG. 6, a plurality of formed regions 127 and a plurality of non-formed regions 128 are arranged alternately along the axial direction.

In this example, the formed region 127 and the non-formed region 128 have the same axial length. The aperture ratio of the formed region 127 formed around the circumference is, for example, 50% or less, more preferably 30% or less.

With the above configuration, the cold air of relatively low temperature before heat exchange with the granules 5 flows into the interior of the second cylinder part 120 through the communication opening 125. This cold air merges with the cold air flowing in from the inlet 111 and freezes the granules 5 inside the second cylinder part 120. Thus, the second cylinder part 120 can sufficiently freeze the granules 5.

The granules 5 are conveyed while contacting the second inner surface 124 in the non-formed region 128 and being lifted by the cold air passing through the communication opening 125 in the formed region 127. This ensures the retention time of the granules 5 in the second cylinder part 120 and allows the granules 5 to be exposed to the cold air in a dispersed state. Thus, the second cylinder part 120 can individually freeze the granules 5 well.

Further, if the communication opening 125 is an elongated hole extending in the axial direction, the cold air flowing into the second cylinder part 120 through the communication opening 125 becomes filmy and hits the granules 5. This allows the cold air to more reliably hit the granules 5 that are dispersed in the axial direction inside the second cylinder part 120. Therefore, the granules 5 inside the second cylinder part 120 can be sufficiently frozen.

6. Example of Freezing Device 2 According to Another Embodiment

A freezing device 2 according to another embodiment will be described with reference to FIGS. 7 and 8. Hereafter, components having the same structure as those of the freezing device 1 will be referred to by the same reference numerals in the drawings, and their detailed descriptions will be omitted or simplified.

Figure 7:
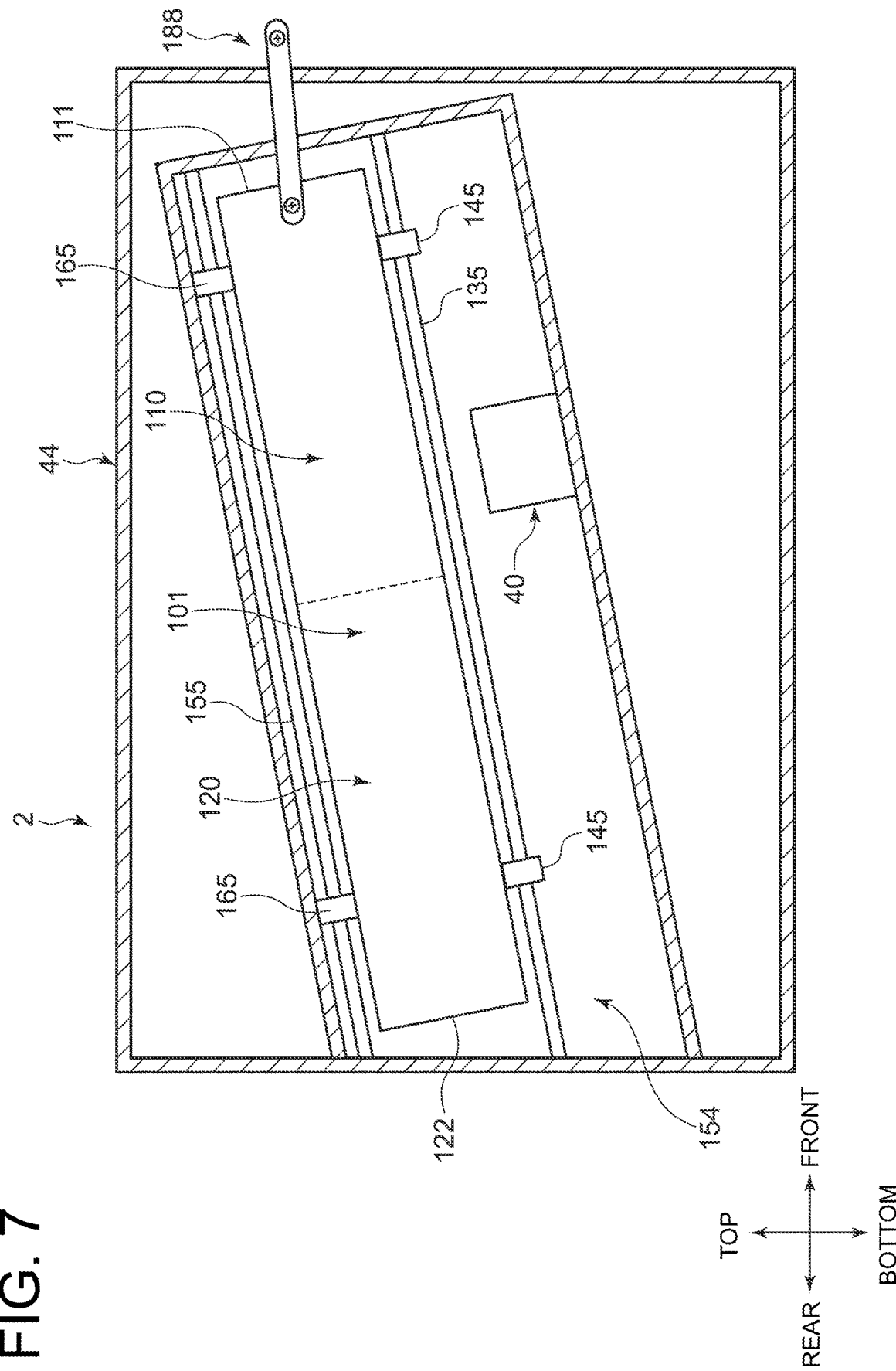
FIG. 7 is a cross-sectional view schematically showing the interior space of a casing of a freezing device according to another embodiment.

FIG. 7 is a cross-sectional view schematically showing the interior space of a casing 44 of the freezing device 2 according to another embodiment. FIG. 8 is a schematic diagram of a cooling drum 101 according to another embodiment as viewed from the axial direction.

In FIG. 7, only the left space of the casing 44 is shown. The right space of the casing 44 has the same configuration as the casing 4 (see FIG. 1), so both the illustration and detailed description are omitted.

The left space of the casing 44 is provided with a drum accommodation chamber 154. In the drum accommodation chamber 154, the cooling drum 101 is installed horizontally in an inclined position with respect to the horizontal direction. The cooling drum 101 is inclined so that it is positioned lower toward the rear, i.e., the downstream side. Granules 5 are fed into the inlet 111 of the cooling drum 101 by a feeding device 188 such as a conveyor belt, for example. The structure of the cooling drum 101 is the same as that of the cooling drum 100, and the only difference between the two is the placement posture.

Figure 8:
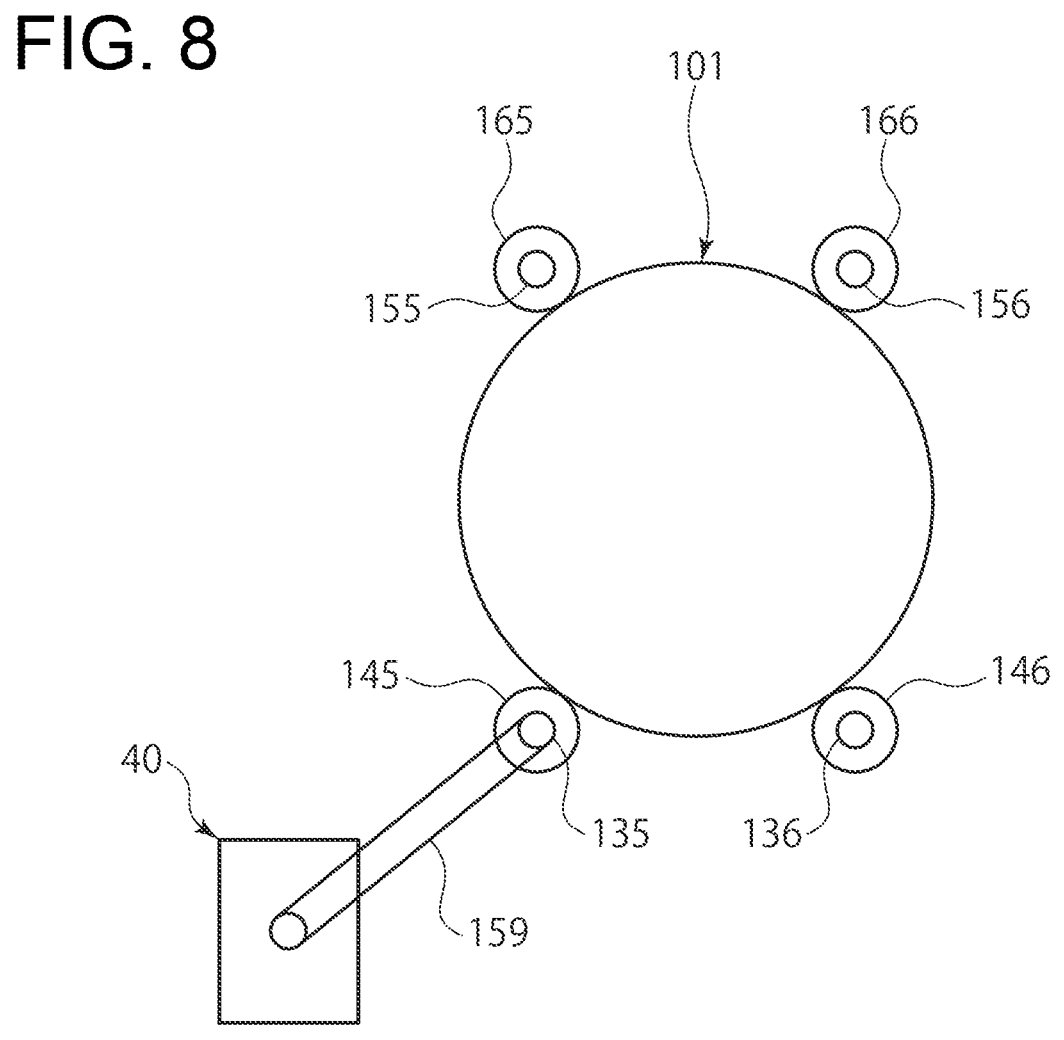

As shown in FIG. 8, on the lower side of the cooling drum 101 are driving rollers 145, 146 respectively fixed to drive shafts 135, 136 extending parallel to the cooling drum 101.

In this example, the driving rollers 145, 146 are disposed below each of the first cylinder part 110 and the second cylinder part 120. The drive shaft 135 is connected to a motor 40 (see FIG. 7) below the cooling drum 101 via a chain belt 159, and the drive shafts 135, 135 are connected to each other via another chain belt (not shown).

Additionally, on the upper side of the cooling drum 101 are driven rollers 165, 166 rotatably provided on fixed shafts 155, 156 extending parallel to the cooling drum 101. The driven rollers 165, 166 are provided at the same position as the driving rollers 145, 146 in the axial direction of the cooling drum 101.

In the above configuration, the driving rollers 145, 146 are driven to rotate when the motor 40 is driven, allowing the cooling drum 101 to rotate, while the driven rollers 165, 166 assist in the rotation of the cooling drum 101.

Even in this case, part of the cold air sent by the blowing means 7 of the freezing device 2 flows into the interior of the cooling drum 101 through the inlet 111 and conveys the granules 5 toward the downstream side.

The following describes the cooling drum (100, 101) for freezing granules and the rotary freezing device (1, 2) for freezing granules according to some embodiments.

1) A cooling drum (100, 101) for freezing granules according to an embodiment of the present disclosure is a cooling drum (100, 101) for freezing granules with an inlet (111) for receiving the granules (5) and an outlet (122) located opposite to the inlet (111) for discharging the granules (5). The cooling drum (100, 101) includes: a first cylinder part (110) having a first inner surface (115) formed of a first material; and a second cylinder part (120) located closer to the outlet (122) than the first cylinder part (110) and having a second inner surface (124) formed of a second material. The first material has a lower thermal conductivity than that of the second material.

The granules (5) immediately after being fed into the cooling drum (100, 101) for freezing granules have not yet reached the freezing temperature and therefore contain a relatively large amount of water in the liquid phase. If these granules (5) are cooled rapidly, there is a risk that the granules (5) will adhere to the inner surface of the cooling drum (100, 101) for freezing granules. In this regard, with the configuration 1), the low thermal conductivity of the first material constituting the first inner surface (115) limits the heat exchange between the first inner surface (115) and the granules (5) that have begun to freeze, which prevents the granules (5) from adhering to the first inner surface (115). Thus, it is possible to achieve the cooling drum (100, 101) for freezing granules that prevents the frozen granules (5) from remaining inside.

2) In some embodiments, in the cooling drum (100, 101) for freezing granules described in the above 1), the first cylinder part (110) further includes a protrusion (117) disposed on the first inner surface (115) and extending in an axial direction.

With the configuration 2), the rotating protrusion (117) scrapes up the granules (5) inside the first cylinder part (110) and causes the granules (5) to float in a dispersed state. Thus, the granules (5) can be exposed to the cold air and begin to freeze in a dispersed state, which prevents the granules (5) from freezing in an aggregated state. The granules (5) scraped up by the protrusion (117) is prevented from contacting the first inner surface (115), which further prevents the granules (5) from adhering to the first inner surface (115). Further, since the granules (5) floated in a dispersed state by scraping are separately exposed to the cold air flowing in from the inlet (111), the granules (5) are cooled evenly, and cracking of the granules (5) caused by rapid freezing of the granules (5) can be suppressed. Therefore, the granules (5) can be individually frozen well. Therefore, the granules (5) can be individually frozen well.

3) In some embodiments, in the cooling drum (100, 101) for freezing granules described in the above 2), the protrusion (117) extends over an entire length of the first cylinder part (110).

With the configuration 3), since the granules (5) are continuously scraped up while they pass inside the first cylinder part (110), the granules (5) can be individually frozen better.

4) In some embodiments, in the cooling drum (100, 101) for freezing granules described in any one of the above 1) to 3), in a radial cross-section of the second cylinder part (120), a distance (dimension D) from a center of the second cylinder part (120) to the second inner surface (124) is constant in a circumferential direction.

With the configuration 4), inside the second cylinder part (120), excessive scraping of the granules (5) is suppressed, so the granules (5) move toward the outlet (122) of the second cylinder part (120) while contacting the second inner surface (124). This allows the granules (5) to pass through the second cylinder part (120) for a longer time, promoting the heat exchange between the second inner surface (124) and the granules (5). Thus, the granules (5) can be frozen sufficiently to the inside.

5) In some embodiments, in the cooling drum (100, 101) for freezing granules described in any one of the above 1) to 4), the second cylinder part (120) includes a communication opening (125) connecting a flow passage (second supply passage 20) for cold air formed on an outer side to an inner side of the second cylinder part (120).

With the configuration 5), the cold air of relatively low temperature before heat exchange with the granules (5) flows into the interior of the second cylinder part (120) through the communication opening (125) and merges with the cold air flowing in through the inlet (111). Thus, the granules (5) inside the second cylinder part (120) can be frozen sufficiently to the inside.

6) In some embodiments, in the cooling drum (100, 101) for freezing granules described in the above 5), the second cylinder part (120) includes a cylinder wall (126) on which a formed region (127) where the communication opening (125) is formed and a non-formed region (128) where the communication opening (125) is not formed are arranged along an axial direction.

With the configuration 6), the granules (5) are conveyed to the outlet (122) while contacting the second inner surface (124) in the non-formed region (128) and being lifted in the formed region (127). This ensures the retention time of the granules (5) in the second cylinder part (120) and allows the granules (5) to be exposed to the cold air in a dispersed state. Thus, the second cylinder part (120) can individually freeze the granules (5) well.

7) In some embodiments, in the cooling drum (100, 101) for freezing granules described in the above 5) or 6), the communication opening (125) is an elongated hole extending in an axial direction.

With the configuration 7), the cold air passing through the communication opening (125), which is an elongated hole, becomes filmy and flows into the second cylinder part (120). This allows the cold air to more reliably hit the granules (5) that are dispersed in the axial direction inside the second cylinder part (120). Therefore, the granules (5) inside the second cylinder part (120) can be sufficiently frozen.

8) In some embodiments, in the cooling drum (100, 101) for freezing granules described in any one of the above 1) to 7), the first material is a resin material, and the second material is a metal material.

With the configuration 8), since the first material is a resin material, the heat exchange between the granules (5) and the first inner surface (115) can be limited appropriately. Additionally, since the second material is a metal material, the heat exchange between the granules (5) and the second inner surface (124) can be promoted well.

9) A rotary freezing device (1, 2) for freezing granules according to an embodiment of the present disclosure includes: a cooling drum (100, 101) for freezing granules arranged horizontally described in any one the above 1) to 8); and a pair of support rollers (support rollers 45, driving rollers 145) disposed rotatably on opposite sides of an axis (100A) of the cooling drum (100, 101) for freezing granules and each supporting the cooling drum (100, 101) for freezing granules from below.

With the configuration 9), it is possible to achieve the rotary freezing device (1, 2) for freezing granules that allows the cooling drum (100, 101) for freezing granules to rotate in a more stable manner.

10) In some embodiments, in the rotary freezing device (1, 2) for freezing granules described in the above 9), the freezing device includes: a motor (40); a sprocket (41) coupled to the motor (40); and a chain belt (42) engaging the sprocket (41) and outer teeth formed on the cooling drum (100, 101) for freezing granules.

With the configuration 10), the cooling drum (100, 101) for freezing granules can be rotated with a simple configuration.

Embodiments of the present invention were described in detail above, but the present invention is not limited thereto, and various amendments and modifications may be implemented.

In the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

REFERENCE SIGNS LIST

1, 2 Freezing device
5 Granules
40 Motor
41 Sprocket
42 Chain belt
45 Support roller
100, 101 Cooling drum 110 First cylinder part
111 Inlet
115 First inner surface
117 Protrusion
120 Second cylinder part
122 Outlet
124 Second inner surface
125 Communication opening
126 Cylinder wall
127 Formed region
128 Non-formed region

The invention claimed is:

1. A cooling drum for freezing granules, with an inlet for receiving the granules and an outlet located opposite to the inlet for discharging the granules, the cooling drum comprising:

a first cylinder part having a first inner surface formed of a first material; and a second cylinder part located closer to the outlet than the first cylinder part and having a second inner surface formed of a second material, wherein the first material has a lower thermal conductivity than that of the second material.

2. The cooling drum for freezing granules according to claim 1, wherein the first cylinder part further includes a protrusion disposed on the first inner surface and extending in an axial direction.

3. The cooling drum for freezing granules according to claim 2, wherein the protrusion extends over an entire length of the first cylinder part.

4. The cooling drum for freezing granules according to claim 1, wherein, in a radial cross-section of the second cylinder part, a distance from a center of the second cylinder part to the second inner surface is constant in a circumferential direction.

5. The cooling drum for freezing granules according to claim 1, wherein the second cylinder part includes a communication opening connecting a flow passage for cold air formed on an outer side to an inner side of the second cylinder part.

6. The cooling drum for freezing granules according to claim 5, wherein the second cylinder part includes a cylinder wall on which a formed region where the communication opening is formed and a non-formed region where the communication opening is not formed are arranged along an axial direction.

7. The cooling drum for freezing granules according to claim 5, wherein the communication opening is an elongated hole extending in an axial direction.

8. The cooling drum for freezing granules according to claim 1, wherein the first material is a resin material, and wherein the second material is a metal material.

9. A rotary freezing device for freezing granules, comprising:

a cooling drum for freezing granules according to claim 1, the cooling drum being arranged horizontally; and a pair of support rollers disposed rotatably on opposite sides of an axis of the cooling drum for freezing granules, each support roller of the pair of support rollers supporting the cooling drum for freezing granules from below.

10. The rotary freezing device for freezing granules according to claim 9, further comprising:

a motor;

a sprocket coupled to the motor; and a chain belt engaging the sprocket and outer teeth formed on the cooling drum for freezing granules.

* * * * *